H. W. HILL.
LENS.
APPLICATION FILED DEC. 9, 1919.
1,340,715.
Patented May 18, 1920.
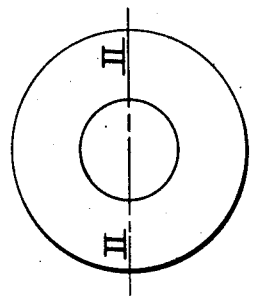
FIG. I
FIG. II
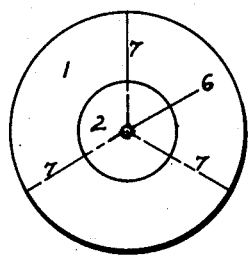
FIG. III
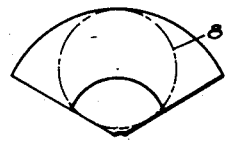
FIG. IV
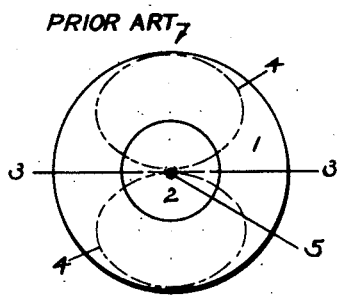
FIG. V
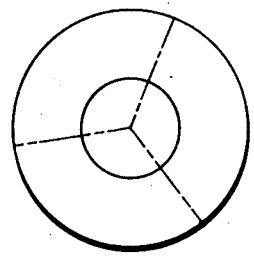
FIG. VI
INVENTOR
HARRY W. HILL
BY
H. H. Styll & H. K. Parsons
ATTORNEYS.

UNITED STATES PATENT OFFICE.

HARRY W. HILL, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS.

1,340,715.   Specification of Letters Patent.   Patented May 18, 1920.

Application filed December 9, 1919. Serial No. 343,501.

*To all whom it may concern:*

Be it known that I, HARRY W. HILL, a citizen of the United States, residing at Southbridge, in the county of Worcester and State of Massachusetts, have invented certain new and useful Improvements in Lenses, of which the following is a specification.

This invention relates to the manufacture of ophthalmic lenses and has particular reference to an improved blank for making bifocal lenses and to an improved process for the manufacture of said lenses.

The principal object of the invention is to provide means for manufacturing an odd number of one-piece bifocal lenses at the same time.

Other objects of the invention are to provide means for separating the various sectors of the blank without breakage, to prevent the forming of a projection at the center of the lens, to increase the rate of production of one-piece bifocal lenses, to decrease the expense of production of said lenses, and to provide means to facilitate their production.

Other objects and advantages of the invention should be readily apparent by reference to the following specification taken in connection with the drawings, and it will be understood that any modifications or departures may be made from the specific features disclosed, or in the order of the steps of the process within the scope of the claims without departing from the spirit of the invention, the preferred form only being shown for sake of illustration.

Figure I represents a front view of a one-piece bifocal blank.

Fig. II represents a vertical cross section on line II—II of Fig. I.

Fig. III represents a front view of the blank shown in Fig. I, showing the lines on which it is divided or cut into sectors.

Fig. IV represents a front view of one of the sectors cut from Fig. III, showing the lines of the finished lens to be cut from said sector.

Fig. V represents a front view of a prior art blank showing the lines on which two lenses are to be cut therefrom.

Fig. VI is a front view of the blank showing the lines of position of the three parts without perforation at the center.

Prior to this invention it has been the practice in the manufacture of one-piece bifocal lenses to grind a blank in the form of a target, as shown in Fig. V, 1 being the distance portion and 2 being the reading portion. This blank has usually been saucer-like in shape, as shown in cross section in Fig. II, the reading portion being ground on the concave side of the blank. After the concave side of the blank has been finished the blank is cut in half on the line 3—3 of Fig. V, and the finished lenses cut from each half on the dot and dash lines 4—4, Fig. V.

Under that process only two lenses can be manufactured at the same time, making the lenses expensive and slowing up production to quite a considerable extent.

In my invention I can cut three or more sectors from the blank as shown in Fig. VI, but there is a liability to break the lens at the point of intersection of the three dividing lines and thus spoil the expensive blank.

It will be apparent that this same difficulty will exist where any odd number of sectors are to be obtained from the blank because the dividing lines do not cross the entire blank from edge to edge, but simply extend from the edge to the center.

Inspection of Fig. V will show that if the blank is cut with a diamond along the line 3—3 it is a simple matter to cut it in half as the line extends from edge to edge of the blank, but if an odd number of division lines is used the line of cleavage is broken at the center and there is a liability of destroying the reading portion of the sectors.

A difficulty experienced in the manufacture of one-piece bifocal blanks has been that there has been a small projection left at the center of the blank, as shown at 5 in Fig. V.

It is, therefore, the object of my invention to overcome these difficulties and provide means by which an odd number of lenses may be obtained from a blank, to provide means whereby the blank may be separated into several parts without destroying any one of the parts and in such a way that each part may be used for a single lens; and also to get rid of the grinding projection at the center of the blank.

To accomplish these objects I first bore a hole 6 at the center of the blank, as shown in Fig. III. I prefer to do this before grinding any curves on the blank. Then I proceed to grind the blank in the usual manner, that is, grinding the distance portion 1 and the reading portion 2. After the blank has thus been ground with the reading and distance portions having the hole through the center 6, I divide the blank into sectors along the lines 7, Fig. III. These lines extend from the edge of the blank to the central recess 6 and it is clear that the sectors may then be broken out without crumbling the reading portion at the central intersection of the dividing lines 7 as would be liable to happen in the case of a blank divided as shown in Fig. VI.

Having divided out the sector as shown in Fig. III, I next cut out the lens as shown in Fig. IV, cutting out the finished lens along the dot and dash lines 8.

It will be understood that the reading portion will be larger in a blank where more than two lenses are to be obtained than it would be in one from which only two are to be cut. The more sectors we have the larger will be the reading portion and also the distance portion would probably be somewhat enlarged as well.

It will be understood that the steps in my process of manufacturing this blank and the lenses therefrom may be alternated without affecting the final result, as for instance the central aperture 6 may be placed in the blank before any grinding is done at all, or it may be placed in the blank after the reading and distance curves have been ground.

It is also apparent that the second side of the blank may be ground before the blank is cut up into its sectors or after the blank has been separated into its sectors, as desired, and that the final lens may be cut from the sector either before or after the second side is ground, it all depending upon the circumstances of the way the lens is marketed. If the entire lens is made by the manufacturer two sides of the blank can be finished before breaking it into its sectors. If, however, the second side is put on by the optician it will be placed on there after the sector has been made, as the sector will probably be sold by the manufacturer to the optician with the curve only on one side, the optician putting on the second curve to obtain the desired prescription presented to him.

From the foregoing description it will be seen that I have provided means by which the number of lenses obtained from a one-piece bifocal blank may be increased; that I have eliminated the danger of breakage in the manufacture of such lenses, and have consequently increased the speed of production of same with the consequent saving in cost of production.

I claim:

1. A blank for a plurality of lenses, a line of cleavage surrounding the center thereof, and cleavage lines extending outwardly from the central cleavage line.

2. A blank for multifocal lenses having concentric zones of different curvatures, a line of cleavage surrounding the center, and cleavage lines extending from the central cleavage line to the edge of the blank.

3. A blank for multifocal lenses having concentric zones of different curvatures, a recess in the central portion, and cleavage lines extending from the recess to the edge of the blank.

4. A blank for a plurality of lenses comprising cleavage lines extending in a direction from the edge of the blank toward the center thereof, and cleavage lines uniting the inwardly extending cleavage lines at a point removed from but adjacent to the center of the blank whereon the blank may be separated into several pieces, each piece in itself forming an independent blank for an ophthalmic lens.

In testimony whereof I have affixed my signature in presence of two witnesses.

HARRY W. HILL.

Witnesses:
ESTHER M. LAFLER,
ALICE G. HASKELL.